Dec. 26, 1967     H. S. FRIEDMAN     3,359,849
OPTICAL MICROMETER

Filed June 18, 1963     2 Sheets-Sheet 1

INVENTOR.
HARRY S. FRIEDMAN
BY
his ATTORNEYS

United States Patent Office 3,359,849
Patented Dec. 26, 1967

3,359,849
OPTICAL MICROMETER
Harry S. Friedman, Northampton, Mass., assignor to Kollmorgen Corporation, Northampton, Mass., a corporation of New York
Filed June 18, 1963, Ser. No. 288,652
3 Claims. (Cl. 88—14)

This invention relates to optical micrometer instruments such as alignment telescopes whereby measurements may be made by deviating the line of sight of the instrument and, more particularly, to a new and improved optical micrometer capable of making such measurements with higher accuracy than has been possible heretofore.

Most conventional alignment telescopes include a reticle, of the cross-hair type or the like, which is centered on the optical axis of the instrument and upon which is superimposed the image of a distant target. To indicate the extent of lateral displacement of the target with respect to the optical axis, the reticle is often marked with a graduated scale, but in such cases it is usually necessary for the operator to estimate the precise location of the target image with respect to the scale markings. In order to permit more accurate measurements, some optical micrometer telescopes, such as described in "Optical Tooling" by Philip Kissam (McGraw Hill, New York, 1962), for example, are arranged so that the line of sight is translated within the instrument by using tilting plates to refract the line of sight through a displacement. Other micrometer telescopes, such as described in the Keuffel et al. Patent No. 2,784,641, for example, are arranged so that parallel rays entering the telescope are rendered parallel within the telescope and a laterally displaceable Galilean lens arrangement of infinite focal length is mounted within the telescope to intercept the internal parallel rays so that lateral motion of the Galilean lens arrangement is effective to displace the line of sight of the instrument laterally with respect to the optical axis.

In alignment telescopes utilizing the Galilean lens system, however, the relation between the displacement of the Galilean lens arrangement and the resulting deviation of the line of sight from the optical axis is proportional to the magnification of the objective lens system multiplied by the magnification of the Galilean lens arrangement minus one. Consequently, for any given objective lens arrangement, this relation is relatively fixed since suitable Galilean lens systems do not have a wide range of magnifications. Also, since the Galilean lens arrangement in such telescopes necessarily has a magnification close to unity, and the line of sight deviation is proportional to the difference between this magnification and unity, a small error in producing this magnification results in a large error in the deviation determination.

Accordingly, it is an object of the present invention to provide a new and improved optical micrometer which effectively overcomes the above-mentioned disadvantages of the prior art.

Another object of the invention is to provide a new and improved optical micrometer which is capable of making measurements with a high degree of accuracy.

These and other objects of the invention are attained by providing a micrometer telescope having an objective lens system for forming an image of a remote object and a laterally displaceable lens arrangement of finite focal length disposed so as to intercept non-parallel image-forming rays from the objective lens system. In order to produce lateral deviation or translation of the line of sight parallel to the optical axis of the telescope, the displaceable lens arrangement is located with its primary principal plane in the infinity focal plane of the preceding lens system, and to produce angular deviation of the line of sight in a collimator-type micrometer telescope, the displaceable lens arrangement is located between the objective lens system and its infinity focal plane so as to intercept the converging image-forming rays from the objective. If desired, the displaceable lens system may comprise a plurality of lens elements which are independently displaceable in different directions transverse to the optical axis of the system so as to cause corresponding deviations of the line of sight of the system independently.

Further objects and advantages of the invention will be apparent from a reading of the following description in conjunction with the accompanying drawings, in which.

Figure 1:
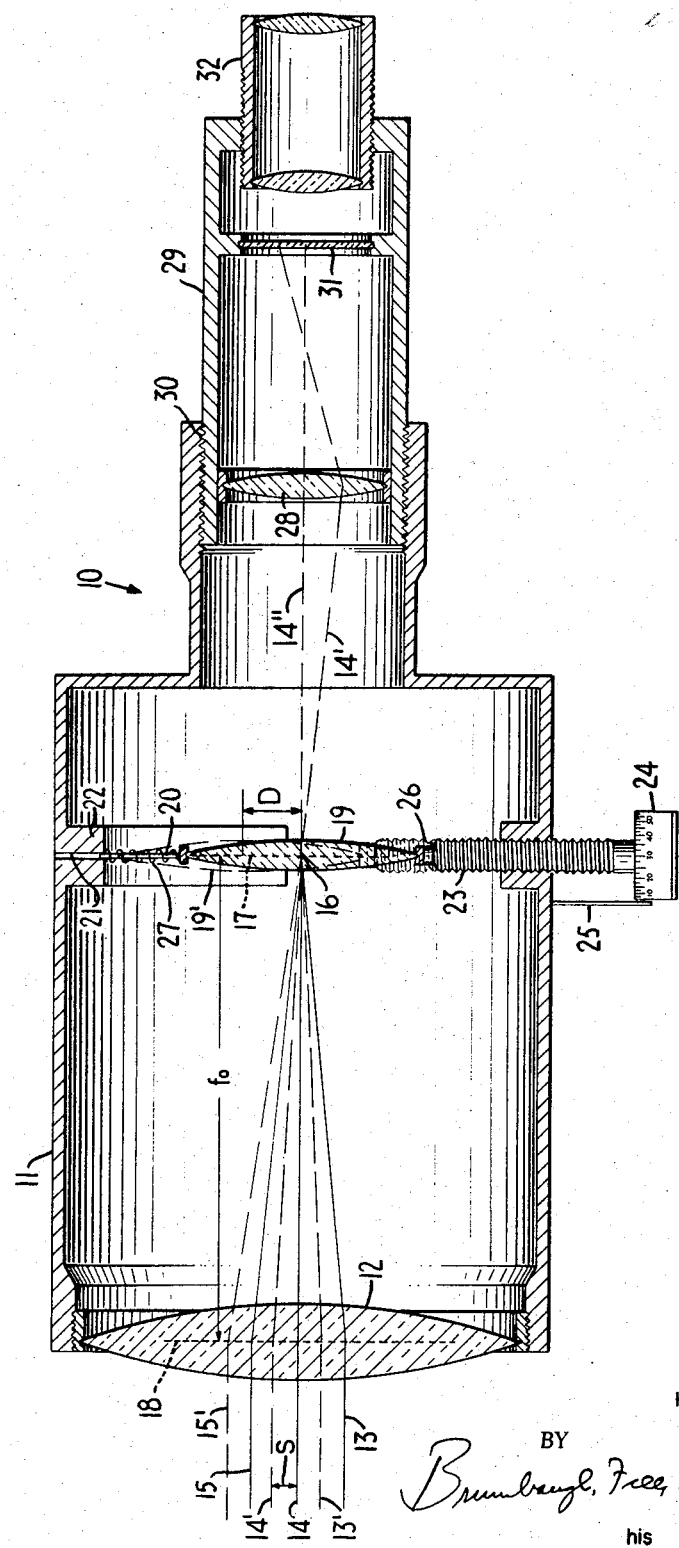
FIG. 1 is a view in longitudinal section, partly schematic, illustrating a representative optical micrometer arranged according to the invention.

In the representative embodiment of the invention shown in FIG. 1, an optical micrometer in the form of an alignment telescope 10 comprises a first tube 11 having an objective lens 12 at its forward end and another lens 19 rearwardly thereof positioned with its primary principal plane located in the infinity focal plane of all of the preceding lens elements combined, this plane being designated in the drawing by the dotted line 17, so that all parallel rays 13, 14 and 15 entering the lens 12 are focused at a point 16 in the plane 17. Accordingly, the primary principal plane of the element 19 is spaced rearwardly from the second principal plane 18 of all of the preceding lens elements by a distance equal to $f_o$ which represents the equivalent focal length of the preceding elements. It will be understood that the objective lens arrangement of the telescope 10 may, if desired, comprise a plurality of lens elements rather than the single element 12 and that, in such cases, the dotted line 17 designates the infinity focal plane and $f_o$ represents the equivalent focal length of the system incorporating that combination.

In accordance with the invention, the lens element 19 is mounted within the telescope for perpendicular motion with respect to the optical axis thereof. To facilitate lateral displacement of this lens and permit accurate measurement of the extent of this displacement, the lens 19 is supported in a sliding member 20 which is slidably received in a corresponding slot 21 in a support segment 22 mounted on one side of the telescope tube 11. On the opposite side of the telescope tube a graduated micrometer screw 23, provided with an external indicator drum 24 and a pointer 25, is mounted in the tube 11 so as to bear against the mount of the lens 19 perpendicularly to the optical axis of the instrument, the lens 19 being urged against the inner end 26 of the micrometer screw by a compression spring 27. Although mechanism for moving the lens 19 in only one direction perpendicularly to the axis is illustrated, it will be understood that another independent micrometer adjustment may be provided to provide an additional dimension of motion for the lens 19, for example, in a direction perpendicular to the plane of FIG. 1.

Rearwardly from the lens 19 a focusing lens 28 is mounted in a second tube 29 which is longitudinally adjustable with respect to the tube 11 as, for example, by screw threads 30, and a reticle 31 which may be of a cross-hair type, for example, is mounted in the tube 29 with its center coincident with the optical axis of the telescope. To permit viewing of the reticle 31 and the image of a distant target by the operator, an eyepiece 32 of the usual type is adjustably mounted at the rear end of the tube 29.

In operation, the telescope 10 is mounted in an appropriate orientation with respect to the desired position of a distance target (not shown) and with the eyepiece 32 adjusted so that the reticle is in focus and with the lens 19 in its central position with respect to the optical axis of the instrument, the position of the tube 29 is adjusted so as to bring the target into focus. The rays of light 13, 14 and 15, which represent the chief rays of bundles of light emanating from laterally spaced points on a remote target enter the lens 12 parallel to the axis and converge to a point in the infinity focal plane 17 of the preceding lens system. With the target located at a finite distance from the lens 12, of course, the various rays in each bundle will be divergent as they enter the lens and will therefore converge to a focus at a point behind the lens 19. If the center of the target is not aligned with the optical axis of the telescope but instead is displaced therefrom by a distance S, the chief rays from the corresponding target points will enter the objective lens along corresponding parallel paths 13', 14' and 15' which are parallel to and laterally displaced from the paths 13, 14 and 15 by the distance S, as indicated in FIG. 1. Considering the chief ray 14' as emanating from the center of a remote target which is laterally spaced from the telescope axis by a distance S, therefore, with the lens 19 centrally positioned on the axis, this ray will pass through the lens 19 and follow the dash line 14' to a location on the reticle 31 which is correspondingly displaced from the instrument axis.

To determine the extent of the misalignment of the target from the optical axis of the telescope, according to the invention, the drum 24 is turned to advance the micrometer screw 23, moving the lens 19 to an off-center position 19' shown in broken lines in FIG. 1, and thereby deviating the line of sight of the telescope until the center of the target appears to coincide with the center of the reticle 31 and the chief ray 14' follows the dash line 14'' from the lens 19 to the center of the reticle 31. If only a single micrometer adjustment is provided for the lens 19 and the direction of the displacement S does not initially coincide with the direction of micrometer adjustment, the instrument 10 is turned about its axis until these directions coincide. On the other hand, if two dimensions of adjustment for the lens 19 are provided as indicated above, both micrometers are moved until the center of the target coincides with the center of the reticle 31. The extent of the lateral lens displacement which is required to bring the line of sight of the instrument into line with the target may be determined from the drum 24 (and a corresponding drum for the second dimension of adjustment, if provided) and is represented in FIG. 1 by the character D, the relation between S and D being given by the equation:

$$S = \frac{D f_o}{f_m}$$

where $f_m$ is the focal length of the micrometer lens 19.

It will be readily apparent, therefore, not only that D and S are linearly proportional for all displacements, but also that, by appropriate selection of the focal lengths of the objective lens system and the micrometer lens 19, the lateral lens displacement D for a given line of sight deviation S can be made quite large, i.e., of the order of ten to one, so that any error in determining the magnitude of the lateral displacement of the lens 19 to bring the target into line results in a much smaller error in the determination of the magnitude of the line of sight deviation S. Furthemore, with a long focal length micrometer lens 19, not only is the percent error in measuring the focal length of the lens very small, but the same percentage error will be carried over into the determination of S, in contrast to the Galilean-type system referred to above. In that system, the line of sight displacement is equal to the lens displacement multiplied by the magnification of the objective lens and by the magnification of the Galilean lens system minus one, so that any error in determining the magnification of the Galilean lens system (which of necessity is not much greater than unity) is correspondingly magnified. In the micrometer of the present invention, moreover, the movable lens 19 may have any desired magnification so that a correspondingly large or small, or equal, relation between the lens and line of sight displacements may be obtained.

Figure 2:
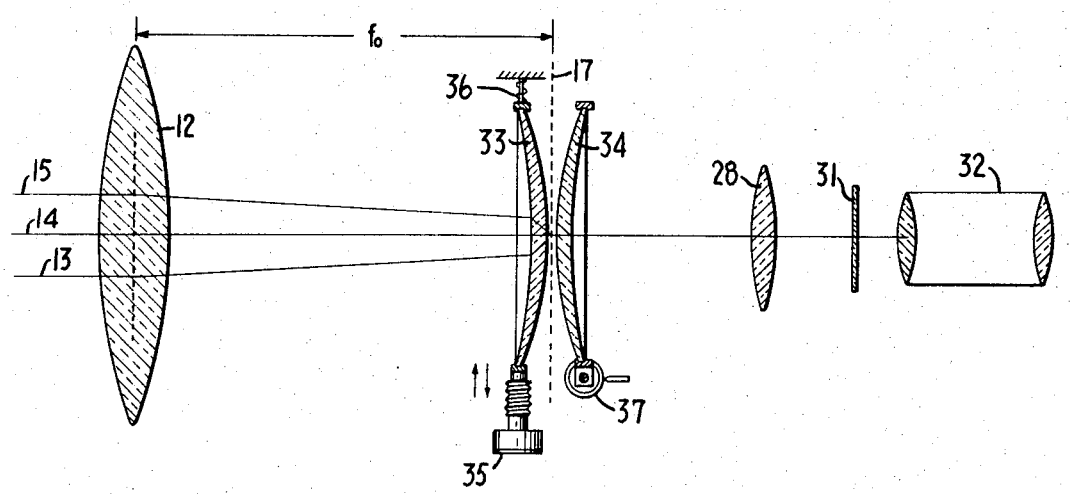
FIG. 2 is a schematic view showing a modified form of micrometer according to the invention capable of providing two independent translations of the line of sight of the instrument.

In some instances, it may be desirable to determine independently the magnitude of the translation required to align the line of sight with the target in two different dimensions, i.e., the horizontal and vertical dimensions, without laterally displacing the lens 19 in two directions. To permit this, the telescope 11 of FIG. 1 may be modified in the manner shown in FIG. 2 by substituting two properly selected, independently movable lens elements 33 and 34 for the micrometer lens 19 of FIG. 1. These lenses must be designed and positioned so that the secondary principal plane of the first lens 33 and the primary principal plane of the second lens 34 both coincide with the position of the infinity focal plane 17 of the combination of all preceding lens elements which, in the illustrated embodiment, includes the objective lens 12 and the first lens 33. Also, the lens 33 is mounted for adjustable lateral motion by a micrometer screw 35 and a spring 36 in one direction perpendicular to the optical aris of the system, i.e., the vertical direction as seen in FIG. 2, in a manner similar to that of the lens 19 of FIG. 1 while the lens 34 is mounted for motion in the mutually perpendicular direction, i.e., the horizontal direction perpendicular to the plane of FIG. 2, another micrometer screw 37 and a spring (not shown) being provided for this purpose.

The operation of this system is essentially the same as that described above with respect to FIG. 1 except that both of the micrometer screws 35 and 37 may be adjusted to bring the line of sight into line with the target and, consequently, the displacement of a target which is both horizontally and vertically misaligned may be measured without rotating the telescope about its longitudinal axis and without requiring one element to be mounted for displacement in two directions independently.

Figure 3:
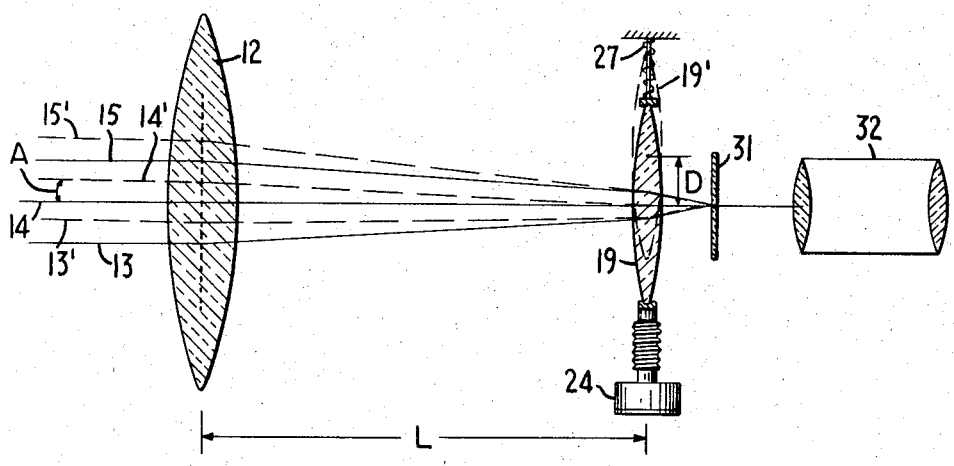
FIG. 3 is a schematic view of a different form of optical micrometer whereby the line of sight of collimated rays is deviated angularly by lens displacement.

In the embodiment shown in FIG. 3, the telescope, having a fixed infinity focus, is arranged to measure the angular deviation of the line of sight of parallel rays entering the objective lens 12. For this purpose the movable lens 19 with its micrometer screw 24 and spring 27 is positioned forwardly of the infinity focal plane of the objective lens so that it is disposed within the region of convergence of the rays 13, 14 and 15 which are parallel as they enter the lens 12. The reticle 31, moreover, is mounted at the infinity focal plane of the combined lenses 12 and 19 so that all parallel rays entering the lens 12 are focused at the reticle.

With this arrangement, the line of sight is deviated through an angle A from the optical axis of the instrument when the micrometer lens 19 is displaced by a distance D from its axial location to the position 19' illustrated in broken lines in FIG. 3. In other words, with the lens 19 at the position 19' parallel rays 13', 14' and 15' entering the lens 12 at an angle A to the optical axis will be focused at the center of the reticle 31. Accordingly, the angular deviation of these rays from the axis, representing, for example, the effect of the deviation of a remote reflecting surface from perpendicularity to the instrument axis may be determined with a high degree of accuracy, the relation between the angle A, in radians and the distance D being expressed by the equation:

$$A = \frac{D}{f_m}\left(1 - \frac{L}{f_o}\right)$$

where $f_o$ and $f_m$ are the focal lengths of the objective lens and the micrometer lens respectively and L is the distance between those lenses. It will be readily apparent, therefore, that this arrangement permits relatively large displacements of the micrometer lens for small angular deviations of the line of sight and is therefore capable of very high accuracy of measurement for the reasons given above with respect to the other embodiments of the invention.

Although the invention has been described herein with reference to specific embodiments, many modifications and variations therein will readily occur to those skilled in the art. Accordingly, all such variations and modifications are included within the intended scope of the invention as defined by the following claims.

I claim:
1. An optical micrometer comprising
  (a) objective lens means for receiving light rays from a remote location and causing the rays to converge toward an image plane rearwardly of the lens,
  (b) laterally displaceable lens means of finite focal length disposed rearwardly of the objective lens means so to intercept non-parallel rays therefrom, said means having at least one lens with a primary principal plane located in the infinity focal plane of the objective lens,
  (c) calibrated means for displacing the laterally displaceable lens means perpendicularly to the axis of the objective lens means,
  (d) reticle means disposed rearwardly of the objective lens means and the displaceable lens means to provide a reference pattern related to the axis of the objective lens means,
  (e) focusing lens means interposed between the displaceable lens means and the reticle means to permit focusing of the rays from the objective and laterally displaceable lens means in the plane of the reticle, and
  (f) adjustable eyepiece means disposed rearwardly of the reticle means to permit an operator to focus on the said reticle.
2. An optical micrometer according to claim 1 wherein the displaceable lens means comprises a first lens element having its first principal plane located in the infinity focal plane of the objective lens and its secondary principal plane located rearwardly of that element, and a second element having its primary principal plane located forwardly of that element and coincident with the secondary principal plane of the first element, the said coincident secondary and primary principal planes being located in the infinity focal plane of the combination of the objective lens and said first lens element, and the first and second elements are each linked to one of a plurality of calibrated independently movable means for independent motion thereby.
3. An optical micrometer according to claim 1 wherein the focal length of the displaceable lens means is greater than the focal length of the objective lens means.

References Cited

UNITED STATES PATENTS

| | | | |
|---|---|---|---|
| 1,317,213 | 9/1919 | Nutting | 88—2.7 |
| 1,503,758 | 8/1924 | Konig | 88—2.2 |
| 2,784,641 | 3/1957 | Kouffel et al. | 88—32 |
| 2,960,912 | 11/1960 | Baker | 88—32 |

FOREIGN PATENTS

| | | |
|---|---|---|
| 428,618 | 5/1926 | Germany. |
| 394,285 | 6/1933 | Great Britain. |

OTHER REFERENCES

Kissam, P.: Optical Tooling, New York, McGraw-Hill, 1962, pp. 92–95.

JEWELL H. PEDERSEN, *Primary Examiner.*

DAVID H. RUBIN, *Examiner.*

J. G. BOLTEN, A. A. KASHINSKI, *Assistant Examiners.*